US012267826B2

(12) United States Patent
Li et al.

(10) Patent No.: US 12,267,826 B2
(45) Date of Patent: Apr. 1, 2025

(54) GC-DCI RESOURCE REALLOCATION FOR SPS PUSCH

(71) Applicant: QUALCOMM Incorporated, San Diego, CA (US)

(72) Inventors: Qiaoyu Li, Beijing (CN); Chao Wei, Beijing (CN); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 17/597,872

(22) PCT Filed: Sep. 4, 2020

(86) PCT No.: PCT/CN2020/113498
§ 371 (c)(1),
(2) Date: Jan. 27, 2022

(87) PCT Pub. No.: WO2021/043266
PCT Pub. Date: Mar. 11, 2021

(65) Prior Publication Data
US 2022/0256556 A1    Aug. 11, 2022

(30) Foreign Application Priority Data

Sep. 6, 2019    (WO) ................ PCT/CN2019/104739

(51) Int. Cl.
*H04W 72/121*    (2023.01)
*H04L 1/00*    (2006.01)
(Continued)

(52) U.S. Cl.
CPC ......... *H04W 72/121* (2013.01); *H04L 1/0003* (2013.01); *H04W 24/08* (2013.01);
(Continued)

(58) Field of Classification Search
CPC ............... H04W 72/121; H04W 24/08; H04W 72/0446; H04W 72/0453; H04W 72/23;
(Continued)

(56) References Cited

U.S. PATENT DOCUMENTS 10,397,940 B2    8/2019    Krishnamoorthi et al.
2004/0063442 A1*    4/2004    Goldberg ............... H04W 68/00
455/458
(Continued)

FOREIGN PATENT DOCUMENTS

CN    101785218 A    7/2010
CN    109698739 A    4/2019
(Continued)

OTHER PUBLICATIONS

International Search Report and Written Opinion—PCT/CN2019/104739—ISA/EPO—May 28, 2020.
(Continued)

*Primary Examiner* — Afshawn M Towfighi
(74) *Attorney, Agent, or Firm* — Procopio, Cory, Hargreaves & Savitch LLP

(57) ABSTRACT

A configuration of providing uplink resources that supports low throughput traffic and high throughput traffic, while providing efficient utilization of downlink resources. The apparatus configures at least one UE with a set of group identifiers, the set of group identifiers including at least one group identifiers. The apparatus transmits a GC-DCI in a GC search space, the GC-DCI indicates to the at least one UE a change of uplink data resources, the GC-DCI may be encoded using a group identifier from the set of group identifiers.

30 Claims, 9 Drawing Sheets

(51) Int. Cl.
    *H04W 24/08*      (2009.01)
    *H04W 72/0446*    (2023.01)
    *H04W 72/0453*    (2023.01)
    *H04W 72/23*      (2023.01)

(52) U.S. Cl.
    CPC ... *H04W 72/0446* (2013.01); *H04W 72/0453* (2013.01); *H04W 72/23* (2023.01)

(58) Field of Classification Search
    CPC ...... H04W 8/186; H04W 8/26; H04L 1/0003; H04L 5/0096
    See application file for complete search history.

(56) References Cited

U.S. PATENT DOCUMENTS

| | | | |
|---|---|---|---|
| 2006/0176838 A1* | 8/2006 | Lee | H04W 4/06 370/312 |
| 2018/0270699 A1* | 9/2018 | Babaei | H04W 28/0278 |
| 2018/0270807 A1* | 9/2018 | Salem | H04W 72/0446 |
| 2018/0295651 A1* | 10/2018 | Cao | H04W 72/23 |
| 2018/0317213 A1 | 11/2018 | Islam et al. | |
| 2020/0245302 A1* | 7/2020 | Pan | H04L 5/0094 |
| 2021/0051701 A1* | 2/2021 | Fakoorian | H04L 1/1896 |
| 2022/0140977 A1* | 5/2022 | Xiong | H04L 5/0064 370/329 |

FOREIGN PATENT DOCUMENTS

| | | |
|---|---|---|
| CN | 109819511 A | 5/2019 |
| TW | 201906487 A | 2/2019 |
| WO | 2018022216 A1 | 2/2018 |

OTHER PUBLICATIONS

Mediatek Inc: "Discussions on Search Space and CORESET Designs", 3GPP TSG RAN WG1 Meeting #90bis, 3GPP Draft, R1-1718323, Discussions on Search Space and CORESET Designs_Final, 3rd Generation Partnership Project (3GPP), Mobile Competence Centre, 650, Route Des Lucioles, F-06921 Sophia-Antipolis Cedex, vol. RAN WG1, No. Prague, CZ, Oct. 9, 2017-Oct. 13, 2017, Oct. 8, 2017 (Oct. 8, 2017), 11 Pages, XP051341506, Section 2.1, par. 1-4, Section 2.2, Section 3.3, the whole document.

Mediatek Inc: "Structure of Group-Common PDCCH", R1-1710792 Structure of Group-Common PDCCH_Final, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017, XP051299996, 3 Pages, The Whole Document.

Supplementary European Search Report—EP20861809—Search Authority—The Hague—Sep. 6, 2023.

China Telecom: "UL Inter-UE Multiplexing Between EMBB and URLLC", 3GPP TSG RAN WG1 #97, R1-1906884, May 17, 2019 (May 17, 2019), 3 pages, sections 1-3.

International Search Report and Written Opinion—PCT/CN2020/113498—ISA/EPO—Dec. 8, 2020.

Qualcomm Incorporated: "Uplink Inter-UE Tx Multiplexing and Prioritization", 3GPP Draft, 3GPP TSG-RAN WG1 #97, R1-1907285, Uplink Inter-UE Tx Multiplexing and Prioritization, 3rd Generation Partnership Project (3GPP), Mobile Competence Centre, vol. RAN WG1, No. Reno, Nevada, USA, May 13, 2019-May 17, 2019, May 13, 2019 (May 13, 2019), XP051728725, 7 Pages, Retrieved the Internet: URL:http://www.3gpp.org/ftp/Meetings%5F3GPP%5FSYNC/RAN1/Docs/R1%2D1907285%2Ezip [retrieved on May 13, 2019], Sections 2.2, 2.3 and 2.4.

VIVO: "Summary #2 of UL Inter UE Tx Prioritization/multiplexing", 3GPP TSG RAN WG1 Meeting #97, R1-1907819, May 17, 2019 (May 17, 2019), 35 pages, sections 3 1, 3.2.

* cited by examiner

GC-DCI RESOURCE REALLOCATION FOR SPS PUSCH

CROSS REFERENCE TO RELATED APPLICATION(S)

This application is a 371 National Phase of International Application Serial No. PCT/CN2020/113498, entitled "GC-DCI RESOURCE REALLOCATION FOR SPS PUSCH" and filed on Sep. 4, 2020, which claims the benefit of International Application Serial No. PCT/CN2019/104739, entitled "GC-DCI Resource Reallocation for SPS PUSCH" and filed on Sep. 6, 2019, which are expressly incorporated by reference herein in their entirety.

BACKGROUND

Technical Field

The present disclosure relates generally to communication systems, and more particularly, to resource reallocation procedures in wireless communication networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A communication system may support UEs for eMBB or URLLC services. The communication system may also support non-high end UEs or reduced capability UEs. Such UEs may be referred to as mid-tier and/or low tier UEs. Some examples of reduced capability UEs may include smart wearable devices, industrial sensors, video monitoring/surveillance.

Video surveillance using reduced capability communication may provide reduced cost surveillance using reduced capability UEs. The reduced capability UEs may have relaxed capabilities in comparison to high end UEs that may support eMBB and/or URLLC services, reduced capability communication may support large capacity machine type communication (MTC) (e.g., 100 streams with 2 Mbps/km$^2$) that may be tailored for specific services. Examples of such services may include video surveillance in public areas (e.g., city surveillance, vehicle traffic monitoring) or video monitoring in commercial settings (e.g., fish farm monitoring, mining supervision), among other examples. The monitoring/surveillance services based on reduced capability devices may be provided at a reduced cost and having high efficiency.

Reduced capability communication may be utilized in a smart video surveillance system, where video cameras may be equipped with some artificial intelligence (AI) capabilities. For example, video cameras may include smart detection in which a triggering event may activate remote monitoring and/or uploading of high quality video. Until a triggering event occurs, normal uplink data may include low resolution video traffic that may be uploaded periodically in order to provide a current view from the camera in the absence of a triggering event. Upon the occurrence of a triggering event, the uplink data may transition to bursts of high resolution video traffic that is uploaded to a base station. The uplink resources allocated to a device may support the uploading of the low resolution video traffic, but may not properly or efficiently support the uploading of the high resolution video traffic that occurs following a triggering event. A configuration of uplink resources for the bursts of high resolution video traffic may result in inefficient utilization of downlink resources of the base station prior to the triggering event. Aspects presented herein provide a solution to the problem of providing uplink resources that may support both of the low resolution video traffic and the bursty high resolution video traffic, while providing efficient utilization of downlink resources.

In an aspect of the disclosure, a method, a computer-readable medium, and an apparatus are provided. The apparatus may be a device at a base station. The device may be a processor and/or a modem at a base station or the base station itself. The apparatus configures at least one user equipment (UE) with a set of group identifiers. The set of group identifiers including at least one group identifiers. The apparatus transmits a group common radio downlink control indicator (GC-DCI) in a group common (GC) search space. The GC-DCI indicates to the at least one UE a change of uplink data resources. The GC-DCI may be encoded using a group identifier from the set of group identifiers.

In an aspect of the disclosure, a method, a computer-readable medium, and an apparatus are provided. The apparatus may be a device at a UE. The device may be a processor and/or a modem at a UE or the UE itself. The apparatus receives, from a base station, a set of group identifiers, the set of group identifiers including at least one group identifier. The apparatus receives, from the base station, a GC-DCI indicating a change of uplink data resources, wherein the GC-DCI is encoded using a group identifier from the set of group identifiers. The apparatus transmits an uplink signal, to the base station, based on the change of uplink data resources provided by the GC-DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
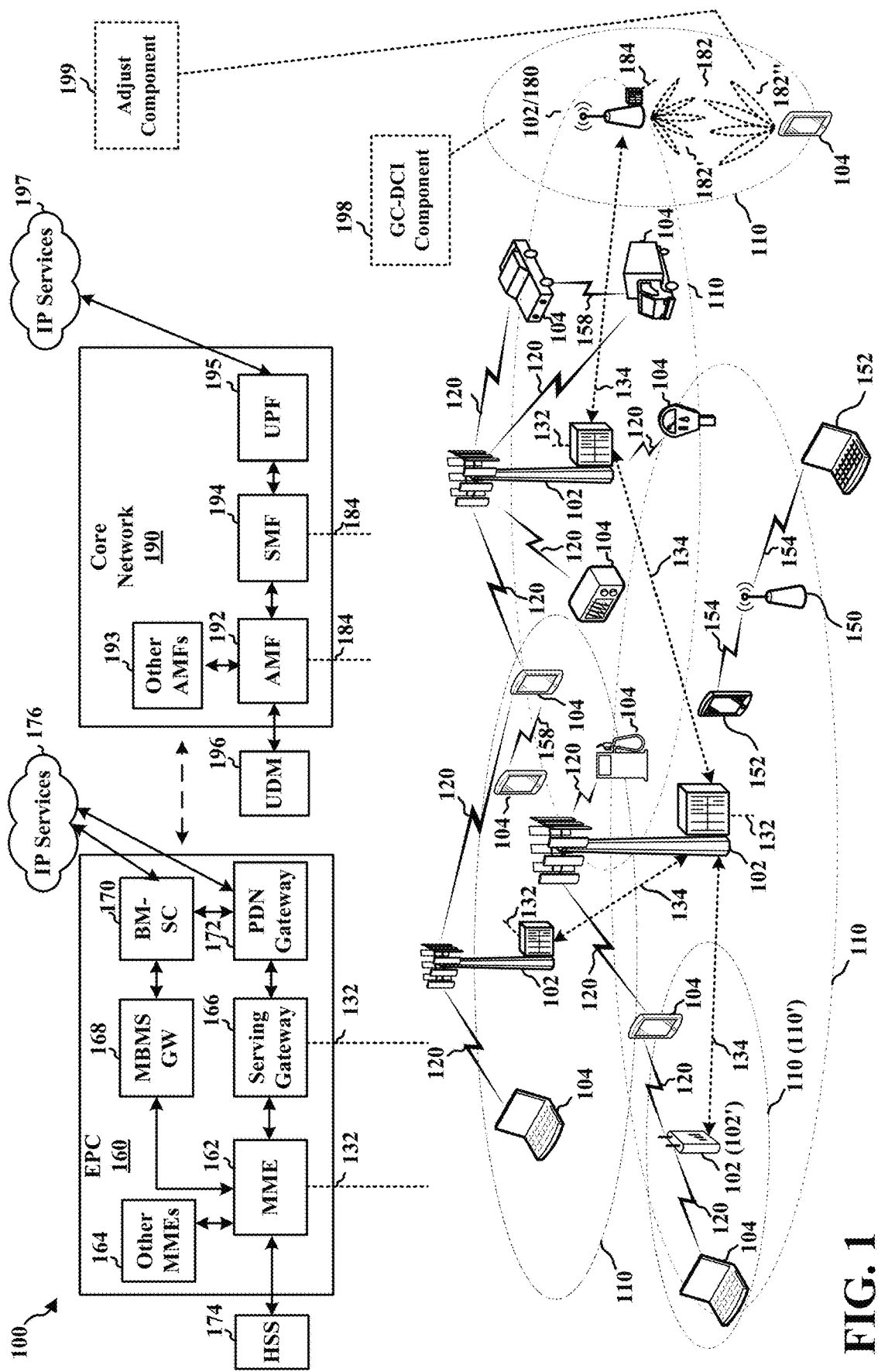
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102, 180 may be configured to adjust frequency domain resources or time domain resources of a UE in response to traffic behavior that provides downlink resource utilization enhancements in resource reallocation procedures. For example, the base station 180 of FIG. 1 includes a GC-DCI component 198 configured to provide a GC-DCI to at least one UE indicating a change of uplink data resources, where the GC-DCI may be encoded using a group identifier from a set of group identifiers. The base station may configure the at least one UE with the set of group identifiers, wherein the set of group identifiers includes at least one group identifier.

Referring again to FIG. 1, in certain aspects, the UE 104 may be configured to adjust its frequency domain resources or time domain resources based on the GC-DCI received from the base station 102, 180. For example, the UE 104 of FIG. 1 includes an adjust component 199 that may be configured to adjust frequency domain resources or time domain resources of the UE within a group of UEs or within one of a respective group of UEs based on the GC-DCI. The UE 104 may receive from the base station 180 a set of group identifiers, where the set of group identifiers includes at least one group identifier, and may also receive the GC-DCI which indicates the change of uplink data resources. The GC-DCI may be encoded using a group identifier from the set of group identifiers. The UE 104 may transmit an uplink signal, to the base station 102, 180, based on the change of uplink resources provided by the GC-DCI.

Although the following description may be focused on 5G NR, the concepts described herein may be applicable to other similar areas, such as LTE, LTE-A, CDMA, GSM, and other wireless technologies.

Figure 2:
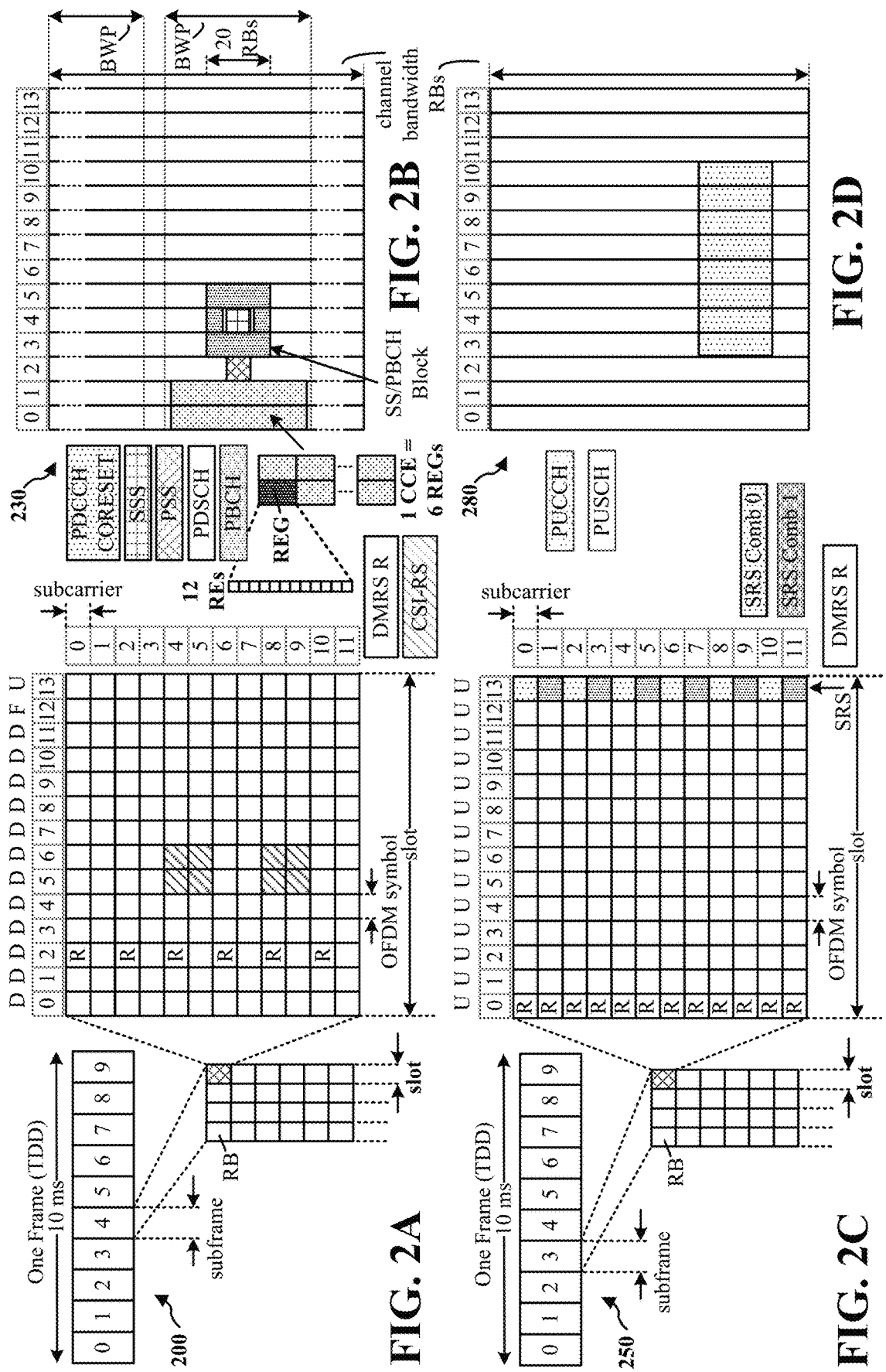
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
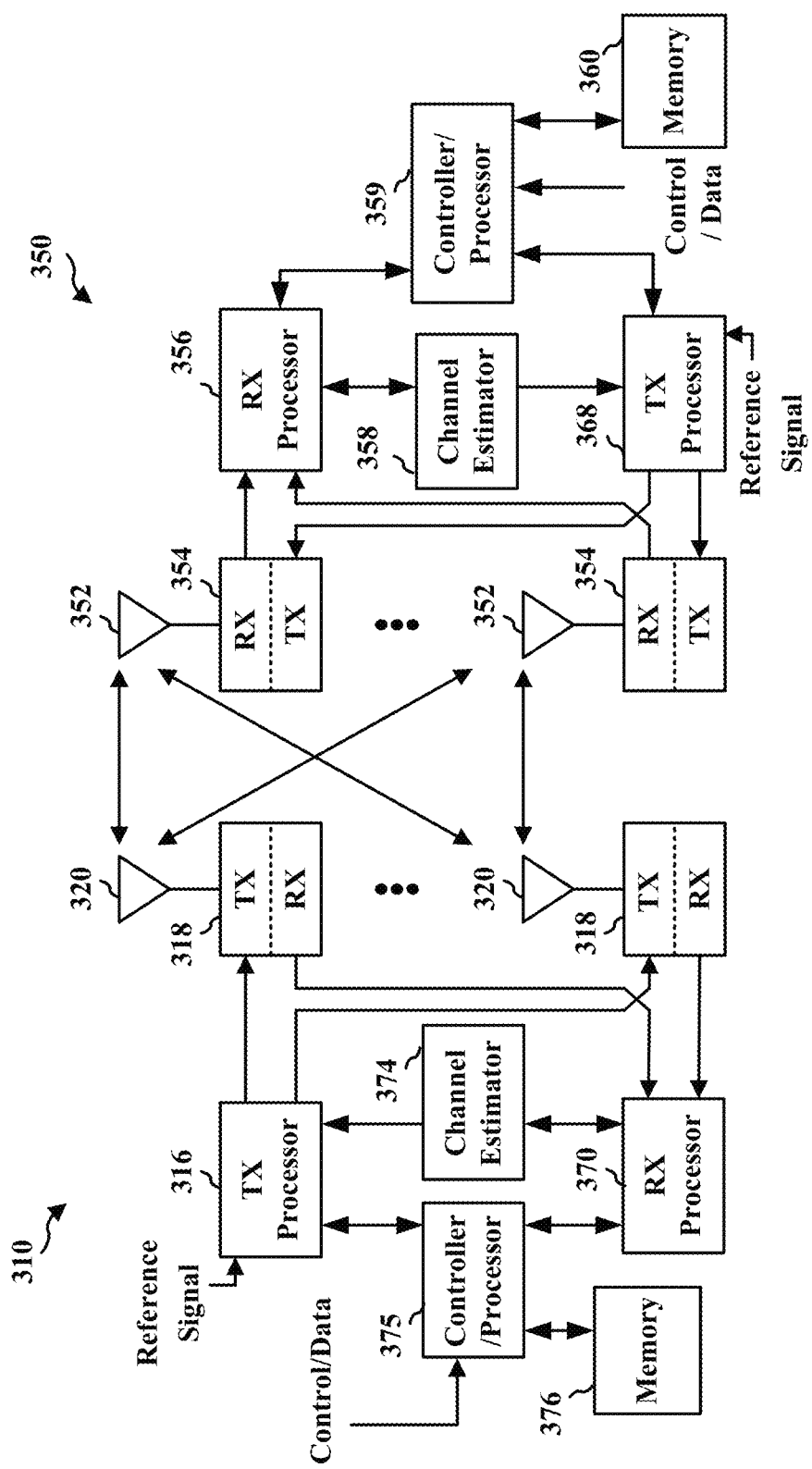
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

A communication system, such as a 5G NR communication system, may support high end UEs, such as UEs supporting eMBB or URLLC services. The communication system may also support non-high end UEs, such as reduced capability UEs. Such UEs may be referred to as mid-tier and/or low tier UEs. Some examples of reduced capability UEs may include smart wearable devices, industrial sensors, or video monitoring/surveillance devices. Reduced capability UEs or non-high end UEs may have lower transmit powers than high end UEs. Reduced capability UEs, may also have hardware limitations in comparison to high end UEs. Some examples of hardware limitations for reduced capability UEs may include a reduced or limited number of receive/transmit antennas or a narrower transmit/receive bandwidth. The hardware limitations may correspond to a reduced complexity of the reduced capability UEs. Some reduced capability UEs may be stationary devices. In some examples, the reduced capability UEs may be located in locations with poor or reduced coverage (e.g., a basement).

Video surveillance using reduced capability communication may enable reduced cost surveillance using reduced capability UEs with relaxed capabilities in comparison to high end UEs that support eMBB and/or URLLC services. Reduced capability communication may support large capacity machine type communication (MTC) (e.g., 100 streams with 2 Mbps/km$^2$) tailored for specific services, such as video surveillance in public areas (e.g., city surveillance, vehicle traffic monitoring) or video monitoring in commercial settings (e.g., fish farm monitoring, mining supervision). Reduced capability communication may enable such surveillance at a reduced cost and with improved efficiency. Reduced capability communication may be configured to support a large number of UEs or customer premises equipment (CPE) having a fixed uplink quality of service (QoS) within a cell. For example, video surveillance using reduced capability communication may support 100+ cameras with 2 Mbps/km2 for public services, 20+ cameras with 25 Mbps per sector, or 1.5-2 times the uplink connection density/spectral efficiency (SE) improvement.

Figure 4A:
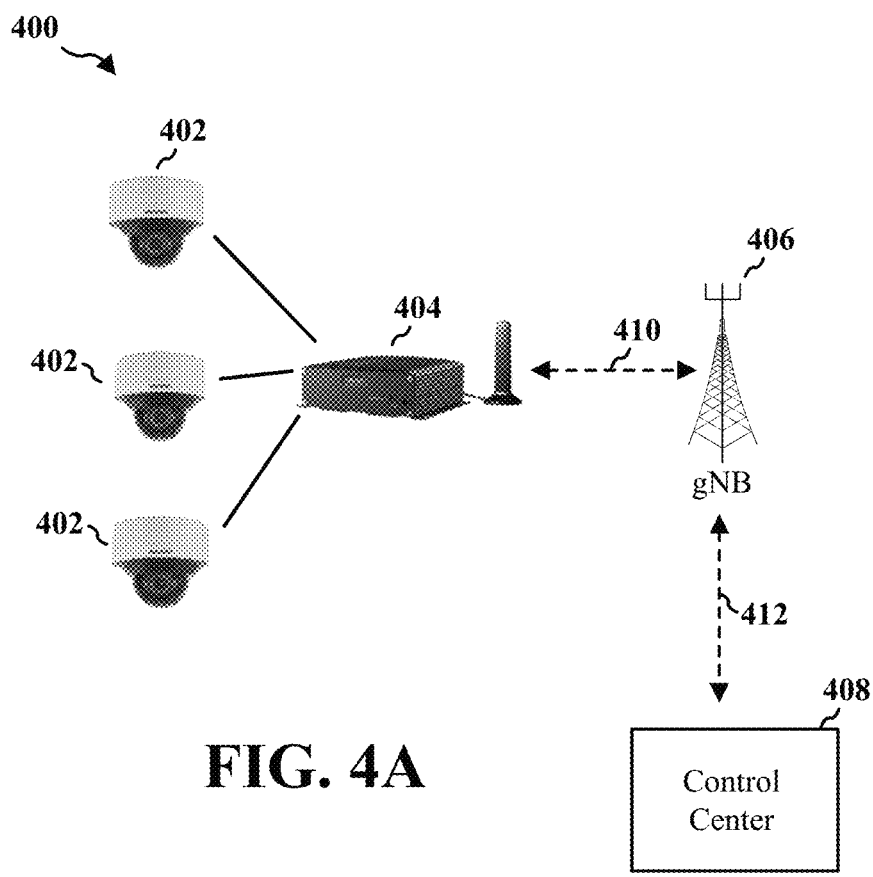
FIG. 4A is a diagram illustrating an example of a base station and UEs in a wireless network.

Reduced capability communication may be utilized in a smart video surveillance system, where video cameras may be equipped with some artificial intelligence (AI) capabilities. For example, with reference to the example 400 of FIG. 4A, video cameras 402 may include a smart detection capability where a triggering event (e.g., motion detection) may trigger one or more alarms to a control center 408 and activate remote monitoring and/or uploading of high quality video. The control center 408 may send a signal 412 to the base station 406 to activate remote monitoring and/or uploading of high quality video in response to the one or more alarms. Prior to a triggering event, the normal uplink traffic 410 may include low resolution video traffic that is periodically uploaded to the network in order to provide a current view in the absence of a triggering event. However, upon the detection or occurrence of a triggering event, the uplink traffic 410 may include bursts of high resolution video traffic that is uploaded by a reduced capability device to a base station 406. In some aspects, the video cameras 402 may provide video to a storage device 404 that may include a reduced capability module that transmits the uplink traffic 410 to the base station 406. In some aspects, the video cameras 402 may be configured to transmit the uplink traffic to the base station 406 and/or to the storage device 404.

A physical uplink shared channel (PUSCH) may be used to transmit at least the periodic low resolution video traffic. A PUSCH may be granted based on two different configurations, a Type-1 PUSCH or Type-2 PUSCH. A Type-1 PUSCH may be configured via RRC signaling, and may also be activated or deactivated via RRC signaling. A Type-2 PUSCH may be configured via RRC signaling, but may be activated or deactivated via DCI. In one example, a UE may be configured with multiple uplink grants, where each uplink grant has different throughput limits. The low resolution video traffic may be streamed through a low throughput PUSCH, but may not be adequate to support the bursty high resolution video traffic. Configuring a high throughput PUSCH for the bursty high resolution video traffic may require deactivation of several UEs streaming low resolution video traffic. In addition, there may be instances in which multiple UEs may request a high throughput PUSCH simultaneously or repeatedly. This may not be an efficient manner of downlink resource utilization, because the deactivation and activation may only be supported via UE specific DCIs. In another example, a UE may be configured with a single uplink grant. The low resolution video traffic may be supported by the single uplink grant, but an uplink grant may need to be dynamically scheduled if bursty high resolution video traffic is to be streamed. Dynamically scheduling the uplink grant for bursty high resolution video traffic may not be efficient in terms of downlink resource utilization, because the uplink video traffic may be long in duration, which may be followed by another uplink grant request to transmit bursty high resolution video traffic. Aspects presented herein provide an uplink grant that supports both the periodic low resolution video traffic and the bursty high resolution video traffic while providing an enhanced downlink resource utilization, such as a GC-DCI based solution that may provide efficiencies in downlink resource utilization.

In some aspects, the uplink grant for the UE may be configured via RRC signaling. The RRC signaling may configure the UE with a number of parameters. For example, the RRC signaling may indicate a number of frequency domain and/or time domain resource allocation options, where each option may be associated with an index. In some aspects, a modulation and coding scheme (MCS) may be configured associated with each frequency resource allocation option. The RRC signaling may configure the UE with a group common radio network temporary identifier (GC-RNTI) to use to monitor for a group common physical downlink control channel (GC-PDCCH) from the base station. In some aspects, the UE may be configured with an offset index to search for the frequency and time resources within the monitored GC-DCI.

Based on the configuration provided by the RRC signaling, the base station may use a GC-DCI to jointly indicate, to at least one UE within at least one group of UEs, a change of uplink data resources (e.g., frequency domain resources and/or time domain resources). The UE may be configured to identify its new frequency domain and/or time domain resources based at least in part on the parameters configured via the RRC signaling and the GC-DCI.

Figure 4B:
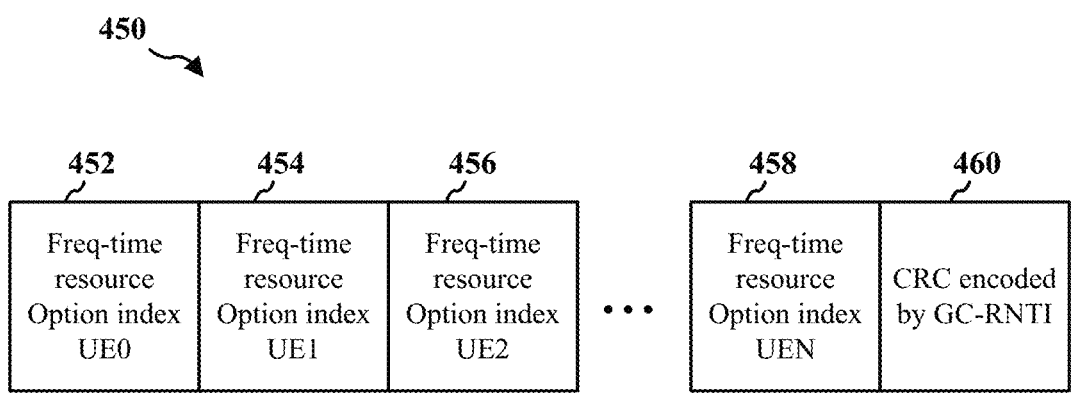
FIG. 4B is a diagram of a GC-DCI in accordance to certain aspects of the disclosure.

FIG. 4B is a diagram 450 of a GC-DCI in accordance to certain aspects of the disclosure. The example diagram 450 of FIG. 4B includes a group of "N+1" UEs, where the first UE of the group is identified as UE0 and the last UE (e.g., "N+1" UE) is identified as UEN. The disclosure is not intended to be limited to the aspects disclosed herein, and the group can have any number of UEs within the group, and there can be any number of groups of UEs, wherein any of the UEs may be within one or more groups. The diagram 450 provides a number of frequency domain and time domain resources allocation options (e.g., 452, 454, 456, 458) identified by an index. For example, the first UE of the group may be identified as UE0, such that the frequency domain and time domain resources allocation would be found within the DCI under index UE0 (e.g., 452). The GC-DCI may be encoded by a GC-RNTI and the UE is configured with one or more GC-RNTIs to use in monitoring for the GC-DCI.

Figure 5:
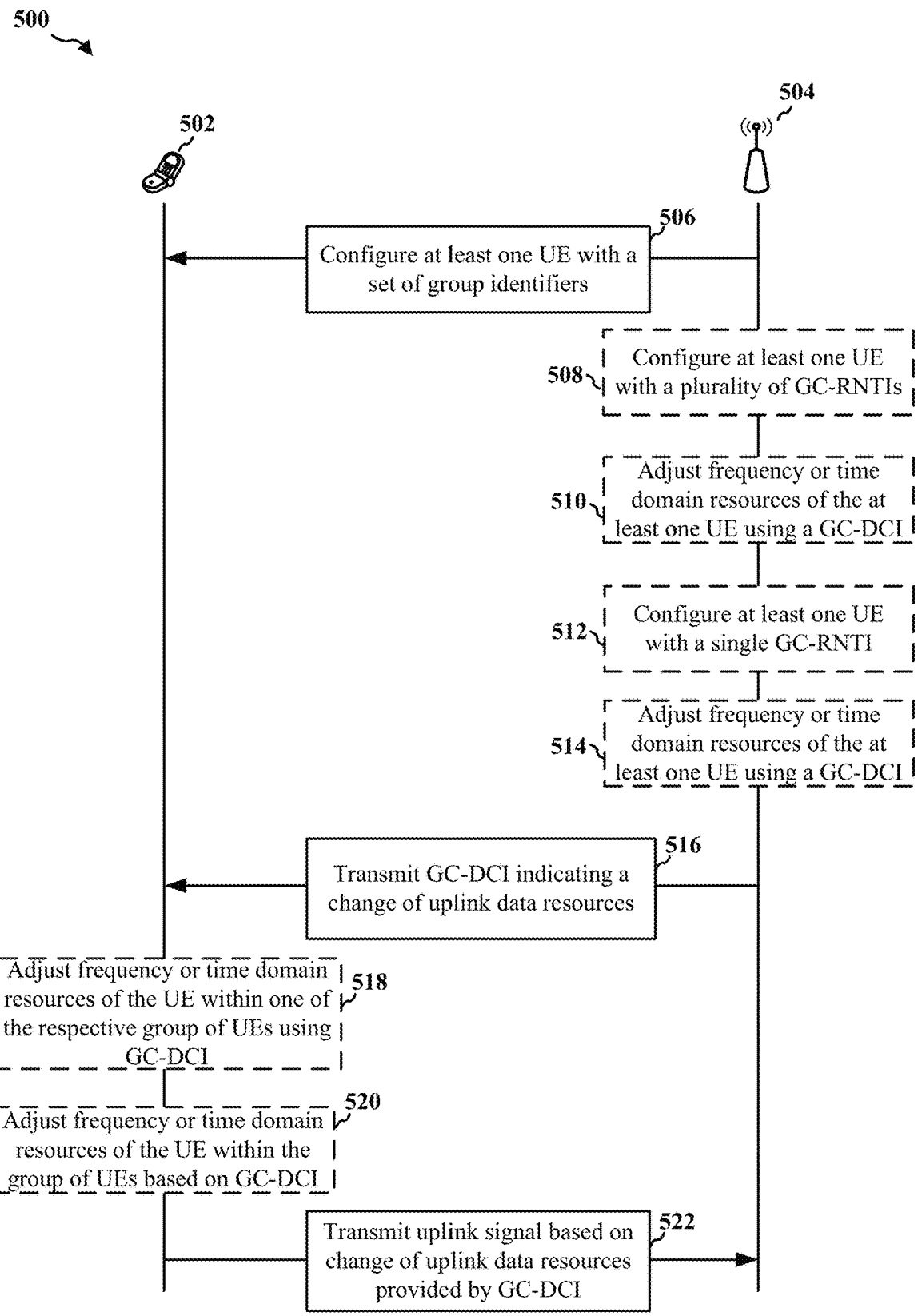
FIG. 5 is a call flow diagram illustrating an example of a change in uplink data resources in accordance with certain aspects of the disclosure.

FIG. 5 is a call flow diagram illustrating an example of a change in uplink data resources in accordance with certain aspects of the disclosure. The diagram 500 of FIG. 5 includes a UE 502 and a base station 504. The base station 504 may be configured to provide a cell. For example, in the context of FIG. 1, the base station 504 may correspond to base station 102/180 and, accordingly, the cell may include a geographic coverage area 110 in which communication coverage is provided and/or small cell 102' having a coverage area of 110'. Further, a UE 502 may correspond to at least UE 104. In another example, in the context of FIG. 3, the base station 504 may correspond to the base station 310 and the UE 502 may correspond to UE 350. In yet another example, in the context of FIG. 4A, the base station 504 may correspond to base station (e.g., gNB) 406, and the UE 502 may correspond to the reduced capability based transmission system. Optional aspects are illustrated with a dashed line.

The base station may be configured to dynamically adjust uplink data resources for one or more UEs in response to traffic behavior from the one or more UEs. For example, a UE may be configured to transmit periodic uplink data that does not exceed the resources allocated to the UE, while in some instances, the UE may need to transmit uplink data that exceeds the allocated resources, such that the base station may dynamically adjust uplink data resources.

At 506, the base station 504 may configure at least one UE (e.g., UE 502) with a set of group identifiers. The set of group identifiers may include at least one group identifier. In some aspects, the base station 504 may configure the at least one UE 502 with the set of group identifiers using a RRC configuration. In some aspects, the set of group identifiers are associated with an index. In some aspects, the set of group identifiers are associated with a modulation and coding scheme.

In some aspects, the base station 504, at 508, may configure the at least one UE 502 with a plurality of group common radio network temporary identifiers (GC-RNTIs). Each of the plurality of GC-RNTIs may be associated with a respective group of UEs of a plurality of groups for resource allocation. In some aspects, the at least one UE may be within at least one group of UEs of the plurality of groups. In some aspects, the at least one UE may be within multiple groups of the plurality of groups of UEs.

In some aspects, the base station 504, at 510, may adjust frequency domain resources or time domain resources of the at least one UE 502 within one of the respective group of UEs. The base station may be configured to adjust the frequency domain resources or time domain resources of the at least one UE 502 by using a GC-DCI that is encoded based on a corresponding GC-RNTI. The base station may adjust the frequency domain resources or time domain resources of the at least one UE 502 by transmitting to the at least one UE 502 the GC-DCI that is encoded based on the corresponding GC-RNTI. Each of the plurality of GC-RNTIs may be associated with at least one of a frequency resource allocation or a time domain resource allocation.

In some aspects, the base station 504, at 512, may configure the at least one UE 502 with a single GC-RNTI. The single GC-RNTI may be associated with a single group of UEs. In some aspects, the at least one UE may be within the single group of UEs.

In some aspects, the base station 504, at 514, may adjust frequency domain resources or time domain resources of the at least one UE 502 within the single group of UEs. The base station 504 may be configured to adjust the frequency domain resources or time domain resources of the at least one UE 502 within the single group of UEs based, in part, on the single GC-DCI encoded using the single GC-RNTI. The base station may adjust the frequency domain resources or time domain resources of the at least one UE 502 by transmitting, to the at least one UE 502, the single GC-DCI that is encoded based on the single GC-RNTI.

At 516, the base station may transmit, to the at least one UE 502, a group common radio downlink control indicator (GC-DCI) in a group common (GC) search space. The GC-DCI may indicate to the at least one UE 502 a change of uplink data resources. In some aspects, the GC-DCI may be encoded using a group identifier from the set of group identifiers. In some aspects, the base station configures the at least one UE 502 with a GC-RNTI to use to monitor for the GC-DCI. In some aspects, the base station may configure the at least one UE 502 with an offset index configured to identify a time-frequency resource for the at least one UE 502 to monitor within the GC-DCI. In some aspects, the change of uplink data resources may be configured to replace a previous uplink data resource allocation. In some aspects, the change of uplink data resources indicated by the GC-DCI may apply for a limited number of transmission opportunities, such that at an end of the limited number of transmission opportunities, a previous uplink data resource allocation may be applied or re-instated.

The at least one UE 502 receives, from the base station, the set of group identifiers and the GC-DCI and decodes the GC-DCI, wherein the GC-DCI indicates the change of uplink data resources. In some aspects, the UE 502, at 518 may adjust its frequency domain resources or time domain resources. The UE 502 may adjust its frequency domain resources or time domain resources within one of the respective group of UEs using the GC-DCI, received from the base station 504, encoded based on a corresponding GC-RNTI. In some aspects, each of the plurality of GC-RNTIs may be associated with at least one of a frequency domain resource allocation or a time domain resource allocation.

In some aspects, the UE 502, at 520, may adjust its frequency domain resources or time domain resources. The UE may adjust its frequency domain resources or time domain resources of the UE within a group of UEs based, in part, on the GC-DCI, received from the base station, encoded using the GC-RNTI. In some aspects, the UE is within a single group of UEs and is configured with a single GC-RNTI, where the GC-RNTI is associated with the single group of UEs.

At 522, the UE 502 may transmit an uplink signal based on the change of uplink data resources. The UE 502 may transmit the uplink signal based on the changed of uplink data resources to the base station 504. In some aspects, the UE 502 may transmit the uplink signal, to the base station 504, based on the change of uplink data resources provided by the GC-DCI.

Figure 6:
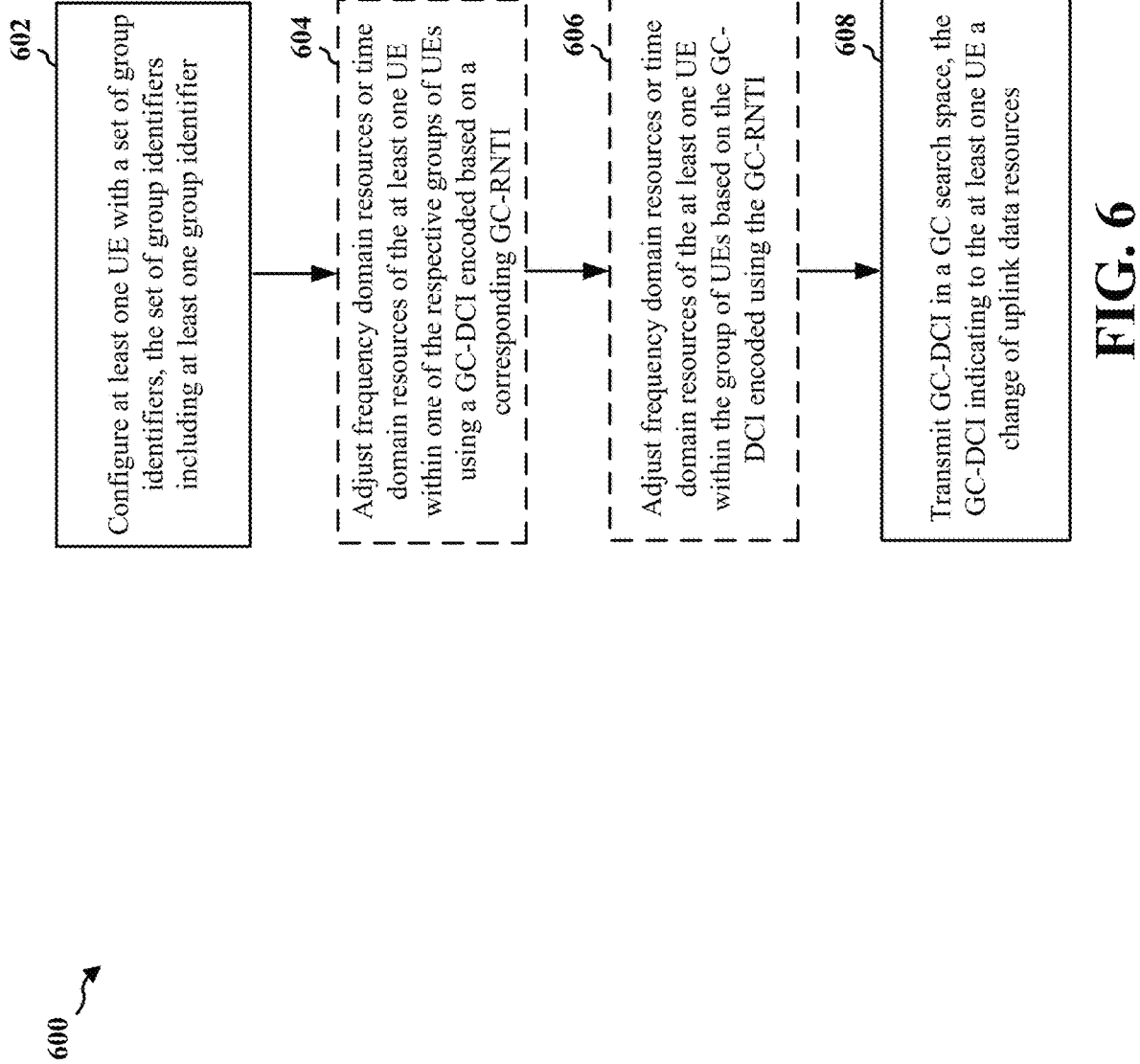
FIG. 6 is a flowchart of a method of wireless communication.

FIG. 6 is a flowchart 600 of a method of wireless communication. The method may be performed by a base station or a component of a base station (e.g., the base station 102/180; the apparatus 702; the baseband unit 704, which may include the memory 376 and which may be the entire base station 310 or a component of the base station 310, such as the TX processor 316, the RX processor 370, and/or the controller/processor 375). According to various aspects, one or more of the illustrated operations of the method 600 may be omitted, transposed, and/or contemporaneously performed. The base station may implement the method of diagram 500. Optional aspects are illustrated with a dashed line. The method may enable a base station to provide efficient downlink resource utilization for periodic and/or bursty traffic (e.g., video surveillance) using GC-DCI.

At 602, the base station may configure at least one UE with a set of group identifiers. For example, 602 may be performed by identifier component 740 of apparatus 702. The set of group identifiers may include at least one group identifier. In some aspects, the base station may configure the at least one UE with the set of group identifiers using a RRC configuration. In some aspects, the set of group identifiers are associated with an index. In some aspects, the set of group identifiers are associated with a modulation and coding scheme.

In some aspects, the base station may configure the at least one UE with a plurality of GC-RNTIs, at 602. Each of the plurality of GC-RNTIs may be associated with a respective group of UEs of a plurality of groups for resource allocation. In some aspects, the at least one UE may be within at least one group of UEs of the plurality of groups. In some aspects, the at least one UE may be within multiple groups of the plurality of groups of UEs.

In some aspects, for example at 604, the base station may adjust frequency domain resources or time domain resources of the at least one UE. For example, 604 may be performed by adjust component 742 of apparatus 702. In some aspects, the at least one UE may be within one of the respective group of UEs. The base station may adjust the frequency domain resources or time domain resources of the at least one UE by using a GC-DCI encoded based on a corresponding GC-RNTI. Each of the plurality of GC-RNTIs may be associated with at least one of a frequency resource allocation or a time domain resource allocation.

In some aspects, at 602, the base station may configure the at least one UE with a single GC-RNTI. The single GC-RNTI may be associated with a group of UEs. In some aspects, the at least one UE may be within a single group of UEs.

In some aspects, for example, at 606, the base station may adjust frequency domain resources or time domain resources of the at least one UE within the group of UEs. For example, 606 may be performed by single adjust component 744 of apparatus 702. The frequency domain resources or time domain resources of the at least one UE within the group of UEs may be adjusted based, in part, on the GC-DCI encoded using the GC-RNTI.

At 608, the base station may transmit a GC-DCI in a GC search space, where the GC-DCI indicates a change of uplink data resources to the at least one UE. For example, 608 may be performed by GC-DCI component 746 of apparatus 702. In some aspects, the GC-DCI may be encoded using a group identifier from the set of group identifiers. In some aspects, the base station configures the at least one UE with a GC-RNTI to use to monitor for the GC-DCI. In some aspects, the base station may configure the at least one UE with an offset index configured to identify a time-frequency resource for the at least one UE to monitor within the GC-DCI. In some aspects, the change of uplink data resources may be configured to replace a previous uplink data resource allocation. In some aspects, the change of uplink data resources indicated by the GC-DCI may apply for a limited number of transmission opportunities, such that at an end of the limited number of transmission opportunities, a previous uplink data resource allocation may be applied or re-instated.

Figure 7:
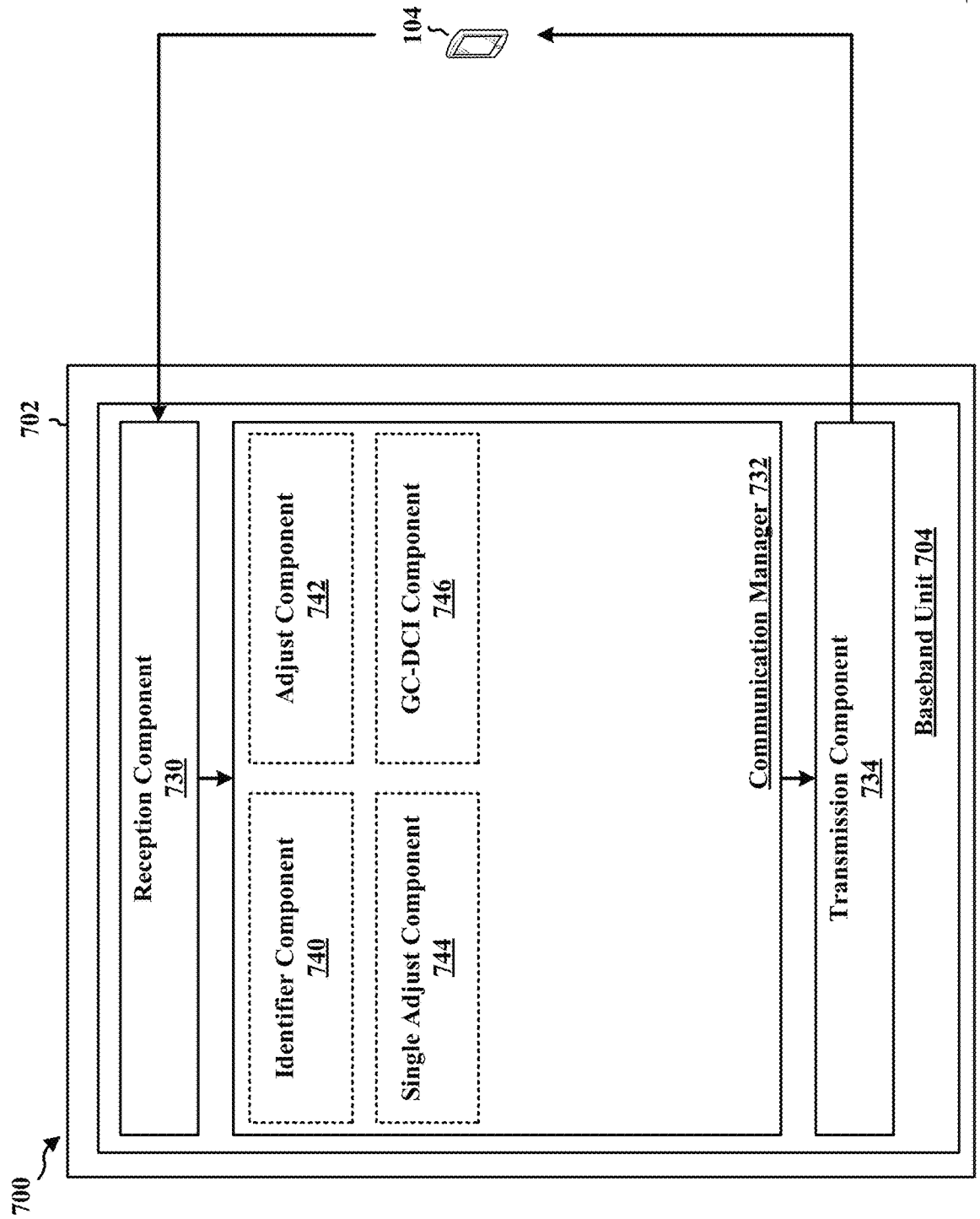
FIG. 7 is a diagram illustrating an example of a hardware implementation for an example apparatus.

FIG. 7 is a diagram 700 illustrating an example of a hardware implementation for an apparatus 702. The apparatus 702 is a BS and includes a baseband unit 704. The baseband unit 704 may communicate through a cellular RF transceiver with the UE 104. The baseband unit 704 may include a computer-readable medium/memory. The baseband unit 704 is responsible for general processing, including the execution of software stored on the computer-readable medium/memory. The software, when executed by the baseband unit 704, causes the baseband unit 704 to perform the various functions described supra. The computer-readable medium/memory may also be used for storing data that is manipulated by the baseband unit 704 when executing software. The baseband unit 704 further includes a reception component 730, a communication manager 732, and a transmission component 734. The communication manager 732 includes the one or more illustrated components. The components within the communication manager 732 may be stored in the computer-readable medium/memory and/or configured as hardware within the baseband unit 704. The baseband unit 704 may be a component of the BS 310 and may include the memory 376 and/or at least one of the TX processor 316, the RX processor 370, and the controller/processor 375.

The communication manager 732 includes an identifier component 740 that may configure at least one UE with a set of group identifiers, e.g., as described in connection with 602 of FIG. 6. The communication manager 732 further includes an adjust component 742 that may adjust frequency domain resources or time domain resources of the at least one UE, e.g., as described in connection with 604 of FIG. 6. The communication manager 732 further includes a single adjust component 744 that may adjust frequency domain resources or time domain resources of the at least one UE within the group of UEs, e.g., as described in connection with 606 of FIG. 6. The communication manager 732 further includes a GC-DCI component 746 that may transmit a GC-DCI in a GC search space, e.g., as described in connection with 608 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the baseband unit 704, includes means for configuring at least one UE with a set of group identifiers. The set of group identifiers including at least one group identifier. The apparatus includes means for transmitting a GC-DCI in a GC search space. The GC-DCI indicating to the at least one UE a change of uplink data resources. The GC-DCI may be encoded using a group identifier from the set of group identifiers. The apparatus further includes means for configuring the at least one UE with a plurality of GC-RNTIs. Each of the plurality of GC-RNTIs may be associated with a respective group of UEs of a plurality of groups for resource allocation. The at least one UE may be within at least one group of UEs of the plurality of groups. The apparatus further includes means for adjusting frequency domain resources or time domain resources of the at least one UE within one of the respective group of UEs using a GC-DCI encoded based on a corresponding GC-RNTI. The apparatus further includes means for configuring the at least one UE with a single GC-RNTI. The single GC-RNTI may be associated with a group of UEs. The apparatus further includes means for adjusting frequency domain resources or time domain resources of the at least one UE within a group of UEs based, in part, on the GC-DCI encoded using the GC-RNTI. The aforementioned means may be one or more of the aforementioned components of the apparatus 702 configured to perform the functions recited by the aforementioned means. As described supra, the apparatus 702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 8:
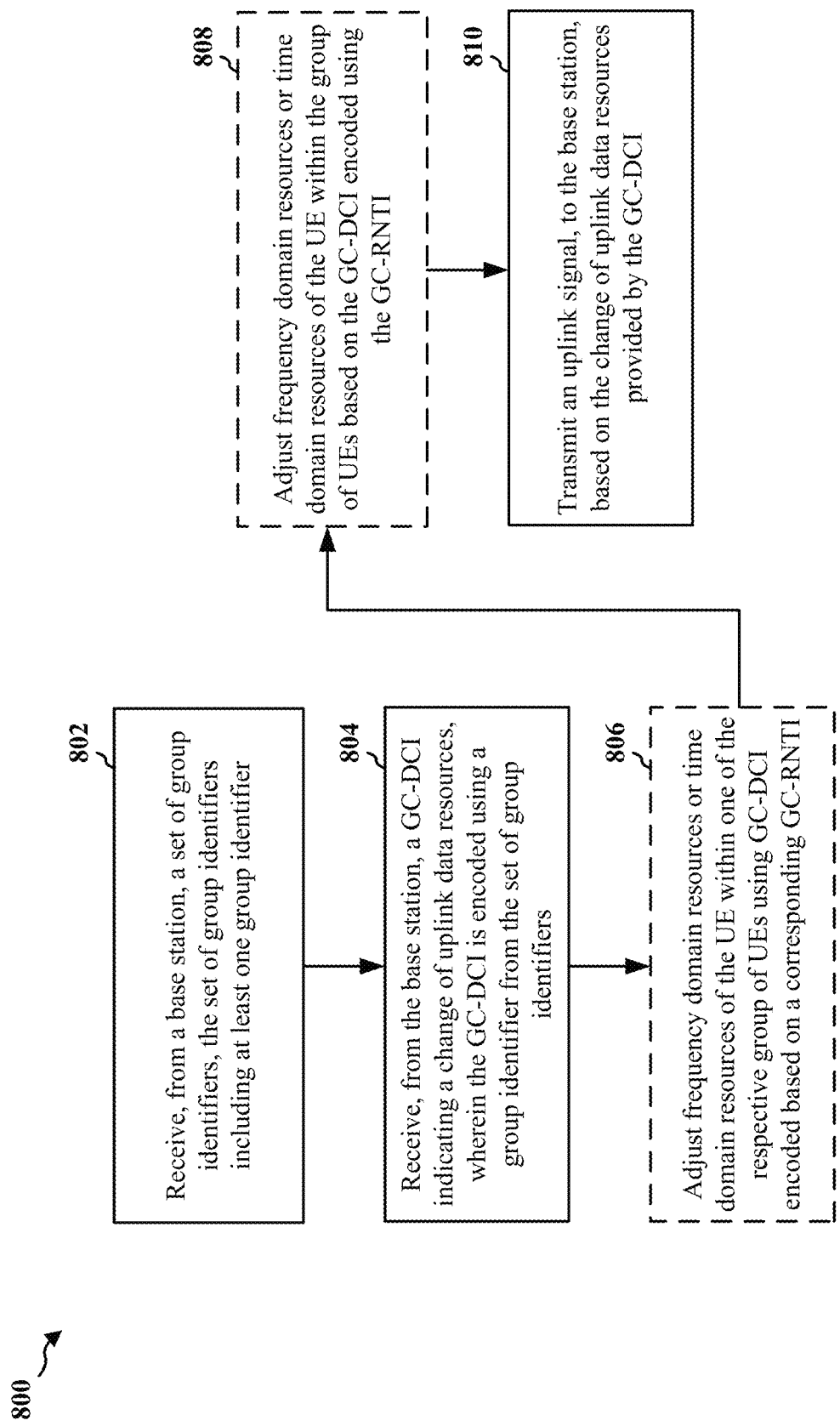
FIG. 8 is a flowchart of a method of wireless communication.

FIG. 8 is a flowchart 800 of a method of wireless communication. The method may be performed by a UE or a component of a UE (e.g., the UE 104, 502; the apparatus 902; the cellular baseband processor 904, which may include the memory 360 and which may be the entire UE 350 or a component of the UE 350, such as the TX processor 368, the RX processor 356, and/or the controller/processor 359). According to various aspects, one or more of the illustrated operations of the method 900 may be omitted, transposed, and/or contemporaneously performed. The UE may implement the method of diagram 500. Optional aspects are illustrated with a dashed line. The method may enable a UE to identify frequency domain or time domain resource allocation changes based at least in part on a GC-DCI.

At 802, the UE may receive, from a base station, a set of group identifiers. For example, 802 may be performed by identifier component 940 of apparatus 902. The set of group identifiers may include at least one group identifier. In some aspects, the UE may receive the set of group identifiers using a RRC configuration. In some aspects, each of the set of group identifiers may be associated with an index. In some aspects, each of the set of group identifiers may be associated with a modulation and coding scheme.

At 804, the UE may receive, from the base station, a GC-DCI indicating a change of uplink data resources. For example, 804 may be performed by GC-DCI component 942 of apparatus 902. The GC-DCI may be encoded using a group identifier from the set of group identifiers. In some aspects, the UE may be configured with a GC-RNTI to use in monitoring for the GC-DCI. In some aspects, the UE may be configured with an offset index identifying a time-frequency resource for the UE to monitor within the GC-DCI. The UE may be configured with a plurality of GC-RNTIs, where each of the plurality of GC-RNTIs may be associated with a respective group of UEs of a plurality of groups for resource allocation. The UE may be within at least one group of UEs of the plurality of groups. In some aspects, the change of uplink data resources may replace a previous uplink data resource allocation. In some aspects, the change of uplink data resources indicated by the GC-DCI may be applied for a limited number of transmission opportunities. For example, at an end of the limited number of transmission opportunities, a previous uplink data resource allocation may be applied or re-instated.

In some aspects, for example, at 806, the UE may adjust frequency domain resources or time domain resources of the UE. For example, 806 may be performed by adjust component 944 of apparatus 902. The UE may adjust frequency domain resources or time domain resources of the UE within one of the respective group of UEs using a GC-DCI encoded based on a corresponding GC-RNTI. In some aspects, each of the plurality of GC-RNTIs may be associated with at least one of a frequency domain resource allocation or a time domain resource allocation.

In some aspects, for example, at 808, the UE may adjust frequency domain resources or time domain resources of the UE within a group of UEs. For example, 808 may be performed by single adjust component 946 of apparatus 902. The UE may adjust frequency domain resources or time domain resources of the UE within the group of UEs based, in part, on the GC-DCI encoded using the GC-RNTI. In some aspects, the UE is within a single group of UEs and is configured with a single GC-RNTI, where the GC-RNTI is associated with a single group of UEs.

At 810, the UE may transmit an uplink signal based on the change of uplink data resources. For example, 810 may be performed by transmission component 934 of apparatus 902. The UE may transmit the uplink signal based on the changed of uplink data resources to the base station. In some aspects, the UE may transmit the uplink signal, to the base station, based on the change of uplink data resources provided by the GC-DCI.

Figure 9:
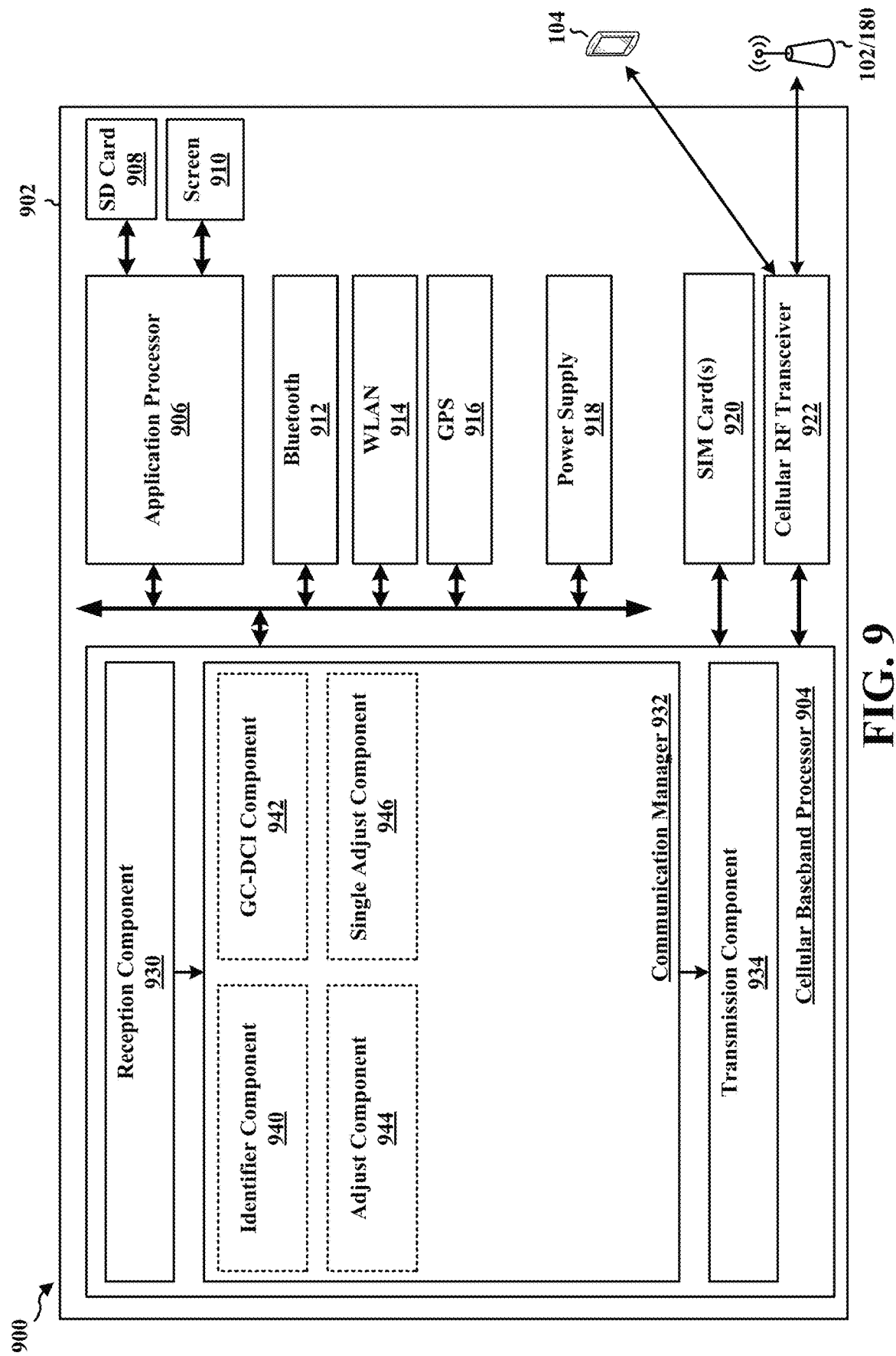
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/ memory. The computer-readable medium/memory may be non-transitory. The cellular baseband processor 904 is responsible for general processing, including the execution of software stored on the computer-readable medium/ memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes an identifier component 940 that is configured to receive, from a base station, a set of group identifiers, e.g., as described in connection with 802 of FIG. 8. The communication manager 932 further includes a GC-DCI component 942 that is configured to receive, from the base station, a GC-DCI indicating a change of uplink data resources, e.g., as described in connection with 804 of FIG. 8. The communication manager 932 further includes an adjust component 944 that is configured to adjust frequency domain resources or time domain resources of the UE, e.g., as described in connection with 806 of FIG. 8. The communication manager 932 further includes a single adjust component 946 that is configured to adjust frequency domain resources or time domain resources of the UE within a group of UEs, e.g., as described in connection with 808 of FIG. 8. The transmission component 934 is configured to transmit an uplink signal based on the change of uplink data resources, e.g., as described in connection with 810 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, a set of group identifiers. The set of group identifiers may include at least one group identifier. The apparatus includes means for receiving, from the base station, a GC-DCI indicating a change of uplink data resources. The GC-DCI may be encoded using a group identifier from the set of group identifiers. The apparatus includes means for transmitting an uplink signal, to the base station, based on the change of uplink data resources provided by the GC-DCI. The apparatus further includes means for adjusting frequency domain resources or time domain resources of the UE within one of the respective group of UEs using a GC-DCI encoded based on a corresponding GC-RNTI. The apparatus further includes adjusting frequency domain resources or time domain resources of the UE within the group of UEs based, in part, on the GC-DCI encoded using the GC-RNTI. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure relates to resource reallocation procedures for low end UEs (e.g., reduced capability UEs). These low end devices may be utilized in a smart video surveillance system, where video cameras may be equipped with some AI capabilities. These low end devices may transmit periodic low resolution video traffic, or in response to a triggering event, may also transmit bursty high resolution video traffic. The uplink resources may support the uploading of the low resolution video traffic, but may not properly or efficiently support the uploading of the high resolution video traffic. Aspects presented herein provide a solution to the problem of providing uplink resources that may support both of the low resolution video traffic and the bursty high resolution video traffic, while providing efficient utilization of downlink resources. In some aspects, a base station may transmit a GC-DCI in a GC search space, where the GC-DCI indicates a change of uplink data resources to at least one UE. At least one advantage of the disclosure is that when the UE is configured within multiple GC-RNTIs associated with different groups of UEs, the use of the GC-DCI provides better flexibility for resource allocation and consumes less DCI overhead. At least another advantage of the disclosure is that when a UE is configured within a single group, there is no need for the UE to try multiple RNTIs for PDCCH blind decoding, which reduces the computational resources at the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a base station comprising configuring at least one user equipment (UE) with a set of group identifiers, the set of group identifiers including at least one group identifier; and transmitting a group common radio downlink control indicator (GC-DCI) in a group common (GC) search space, the GC-DCI indicating to the at least one UE a change of uplink data resources, wherein the GC-DCI is encoded using a group identifier from the set of group identifiers.

In Example 2, the method of Example 1 further includes that the base station configures the at least one UE with the set of group identifiers using a radio resource control (RRC) configuration.

In Example 3, the method of Example 1 or 2 further includes that each of the set of group identifiers are associated with an index.

In Example 4, the method of any of Examples 1-3 further includes that each of the set of group identifiers are associated with a MCS.

In Example 5, the method of any of Examples 1-4 further includes that the base station further configures the at least one UE with a GC-RNTI to use in monitoring for the GC-DCI.

In Example 6, the method of any of Examples 1-5 further includes that the base station further configures the at least one UE with an offset index identifying a time-frequency resource for the at least one UE to monitor within the GC-DCI.

In Example 7, the method of any of Examples 1-6 further includes configuring the at least one UE with a plurality of GC-RNTIs, wherein each of the plurality of GC-RNTIs is associated with a respective group of UEs of a plurality of groups for resource allocation, wherein the at least one UE is within at least one group of UEs of the plurality of groups.

In Example 8, the method of any of Examples 1-7 further includes adjusting frequency domain resources or time domain resources of the at least one UE within one of the respective group of UEs using a GC-DCI encoded based on a corresponding GC-RNTI.

In Example 9, the method of any of Examples 1-8 further includes that each of the plurality of GC-RNTIs is associated with at least one of a frequency domain resource allocation or a time domain resource allocation.

In Example 10, the method of any of Examples 1-9 further includes configuring the at least one UE with a single GC-RNTI, wherein the GC-RNTI is associated with a group of UEs.

In Example 11, the method of any of Examples 1-10 further includes adjusting frequency domain resources or time domain resources of the at least one UE within the group of UEs based, in part, on the GC-DCI encoded using the GC-RNTI.

In Example 12, the method of any of Examples 1-11 further includes that the change of uplink data resources replaces a previous uplink data resource allocation.

In Example 13, the method of any of Examples 1-12 further includes that the change of uplink data resources indicated by the GC-DCI applies for a limited number of transmission opportunities.

In Example 14, the method of any of Examples 1-13 further includes that at an end of the limited number of transmission opportunities, a previous uplink data resource allocation applies.

Example 15 is a device including one or more processors and one or more memories in electronic communication with the one or more processors storing instructions executable by the one or more processors to cause the system or apparatus to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a UE comprising receiving, from a base station, a set of group identifiers, the set of group identifiers including at least one group identifier; receiving, from the base station, a GC-DCI indicating a change of uplink data resources, wherein the GC-DCI is encoded using a group identifier from the set of group identifiers; and transmitting an uplink signal, to the base station, based on the change of uplink data resources provided by the GC-DCI.

In Example 19, the method of Example 18 further includes that the UE receives the set of group identifiers using a radio resource control (RRC) configuration.

In Example 20, the method of Example 18 or 19 further includes that each of the set of group identifiers are associated with an index.

In Example 21, the method of any of Examples 18-20 further includes that each of the set of group identifiers are associated with a MCS.

In Example 22, the method of any of Examples 18-21 further includes that the UE is configured with a GC-RNTI to use in monitoring for the GC-DCI.

In Example 23, the method of any of Examples 18-22 further includes that the UE is configured with an offset index identifying a time-frequency resource for the UE to monitor within the GC-DCI.

In Example 24, the method of any of Examples 18-23 further includes that the UE is configured with a plurality of GC-RNTIs, wherein each of the plurality of GC-RNTIs is associated with a respective group of UEs of a plurality of groups for resource allocation, wherein the UE is within at least one group of UEs of the plurality of groups.

In Example 25, the method of any of Examples 18-24 further includes adjusting frequency domain resources or time domain resources of the UE within one of the respective group of UEs using a GC-DCI encoded based on a corresponding GC-RNTI.

In Example 26, the method of any of Examples 18-25 further includes that each of the plurality of GC-RNTIs is associated with at least one of a frequency domain resource allocation or a time domain resource allocation.

In Example 27, the method of any of Examples 18-26 further includes that the UE is within a group of UEs and is configured with a single GC-RNTI, wherein the GC-RNTI is associated with a group of UEs.

In Example 28, the method of any of Examples 18-27 further includes adjusting frequency domain resources or time domain resources of the UE within the group of UEs based, in part, on the GC-DCI encoded using the GC-RNTI.

In Example 29, the method of any of Examples 18-28 further includes that the change of uplink data resources replaces a previous uplink data resource allocation.

In Example 30, the method of any of Examples 18-29 further includes that the change of uplink data resources indicated by the GC-DCI applies for a limited number of transmission opportunities.

In Example 31, the method of any of Examples 18-20 further includes that at an end of the limited number of transmission opportunities, a previous uplink data resource allocation applies.

Example 32 is a device including one or more processors and one or more memories in electronic communication with the one or more processors storing instructions executable by the one or more processors to cause the system or apparatus to implement a method as in any of Examples 18-31.

Example 33 is a system or apparatus including means for implementing a method or realizing an apparatus as in any of Examples 18-31.

Example 34 is a non-transitory computer readable medium storing instructions executable by one or more processors to cause the one or more processors to implement a method as in any of Examples 18-31.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   configuring at least one user equipment (UE) with a plurality of group identifiers; and
   transmitting, in association with uplink data from the UE exceeding a previous uplink data resource allocation, a group common radio downlink control indicator (GC-DCI) in a group common (GC) search space, the GC-DCI indicating to the at least one UE a change of uplink data resources, wherein the GC-DCI is encoded using a group identifier from the plurality of group identifiers.

2. The method of claim 1, wherein the base station configures the at least one UE with the plurality of group identifiers using a radio resource control (RRC) configuration.

3. The method of claim 1, wherein each of the plurality of group identifiers are associated with an index.

4. The method of claim 1, wherein each of the plurality of group identifiers are associated with a modulation and coding scheme (MCS).

5. The method of claim 1, wherein the base station further configures the at least one UE with a group common radio network temporary identifier (GC-RNTI) to use in monitoring for the GC-DCI.

6. The method of claim 1, wherein the base station further configures the at least one UE with an offset index to search for a time-frequency resource allocation within the GC-DCI.

7. The method of claim 1,
   wherein the plurality of group identifiers comprises a plurality of group common radio network temporary identifiers (GC-RNTIs), wherein each of the plurality of GC-RNTIs is associated with a respective group of UEs of a plurality of groups for resource allocation, wherein the at least one UE is within at least one group of UEs of the plurality of groups.

8. The method of claim 7, further comprising:
   adjusting frequency domain resources or time domain resources of the at least one UE within one of the respective group of UEs using the GC-DCI encoded based on a corresponding GC-RNTI.

9. The method of claim 8, wherein each of the plurality of GC-RNTIs is associated with at least one of a frequency domain resource allocation or a time domain resource allocation.

10. The method of claim 1, further comprising:
    configuring each UE of a group of UEs including the at least one UE with a single group common radio network temporary identifier (GC-RNTI), wherein the GC-RNTI is associated with the group of UEs.

11. The method of claim 10, further comprising:
    adjusting frequency domain resources or time domain resources of the at least one UE within the group of UEs based, in part, on the GC-DCI encoded using the GC-RNTI.

12. The method of claim 1, wherein the change of uplink data resources replaces the previous uplink data resource allocation.

13. The method of claim 1, wherein the change of uplink data resources indicated by the GC-DCI applies for a limited number of transmission opportunities.

14. The method of claim 13, wherein at an end of the limited number of transmission opportunities, the previous uplink data resource allocation applies.

15. An apparatus for wireless communication at a base station, comprising:
    a memory; and
    at least one processor coupled to the memory and configured to:
       configure at least one user equipment (UE) with a plurality of group identifiers; and
       transmit, in association with uplink data from the UE exceeding a previous uplink data resource allocation, a group common radio downlink control indicator (GC-DCI) in a group common (GC) search space, the GC-DCI indicating to the at least one UE a change of uplink data resources, wherein the GC-DCI is encoded using a group identifier from the plurality of group identifiers.

16. A method of wireless communication at a User Equipment (UE), comprising:
    receiving, from a base station, a plurality of group identifiers;
    receiving, from the base station and in association with uplink data from the UE exceeding a previous uplink data resource allocation, a group common radio downlink control indicator (GC-DCI) indicating a change of uplink data resources, wherein the GC-DCI is encoded using a group identifier from the plurality of group identifiers; and
    transmitting an uplink signal, to the base station, based on the change of uplink data resources indicated by the GC-DCI.

17. The method of claim 16, wherein the UE receives the plurality of group identifiers using a radio resource control (RRC) configuration.

18. The method of claim 16, wherein each of the plurality of group identifiers are associated with an index.

19. The method of claim 16, wherein each of the plurality of group identifiers are associated with a modulation and coding scheme (MCS).

20. The method of claim 16, wherein the UE is configured with a group common radio network temporary identifier (GC-RNTI) to use in monitoring for the GC-DCI.

21. The method of claim 16, wherein the UE is configured with an offset index to search for a time-frequency resource allocation within the GC-DCI.

22. The method of claim 16, wherein the plurality of group identifiers comprises a plurality of group common radio network temporary identifiers (GC-RNTIs), wherein each of the plurality of GC-RNTIs is associated with a respective group of UEs of a plurality of groups for resource allocation, wherein the UE is within at least one group of UEs of the plurality of groups.

23. The method of claim 22, further comprising:
    adjusting frequency domain resources or time domain resources of the UE within one of the respective group of UEs using the GC-DCI encoded based on a corresponding GC-RNTI.

24. The method of claim 23, wherein each of the plurality of GC-RNTIs is associated with at least one of a frequency domain resource allocation or a time domain resource allocation.

25. The method of claim 16, wherein the UE is within a group of UEs and is configured with a first group common radio network temporary identifier (GC-RNTI), wherein the first GC-RNTI is associated with the group of UEs.

26. The method of claim 25, further comprising:
adjusting frequency domain resources or time domain resources of the UE within the group of UEs based, in part, on the GC-DCI encoded using the GC-RNTI.

27. The method of claim 16, wherein the change of uplink data resources replaces the previous uplink data resource allocation.

28. The method of claim 16, wherein the change of uplink data resources indicated by the GC-DCI applies for a limited number of transmission opportunities.

29. The method of claim 28, wherein at an end of the limited number of transmission opportunities, the previous uplink data resource allocation applies.

30. An apparatus for wireless communication at a User Equipment (UE), comprising:
- a memory; and
- at least one processor coupled to the memory and configured to:
  - receive, from a base station, a plurality of group identifiers;
  - receive, from the base station and in association with uplink data from the UE exceeding a previous uplink data resource allocation, a group common radio downlink control indicator (GC-DCI) indicating a change of uplink data resources, wherein the GC-DCI is encoded using a group identifier from the plurality of group identifiers; and
  - transmit an uplink signal, to the base station, based on the change of uplink data resources indicated by the GC-DCI.

* * * * *